United States Patent
Larkin et al.

(10) Patent No.: US 9,582,302 B2
(45) Date of Patent: *Feb. 28, 2017

(54) SYSTEM AND METHOD FOR MANAGING CODE ISOLATION

(71) Applicant: Citrix Systems, Inc., Fort Lauderdale, FL (US)

(72) Inventors: Michael Larkin, San Jose, CA (US); James Yarbrough, Fremont, CA (US); Yashabh Sethi, Mountain View, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 847 days.

This patent is subject to a terminal disclaimer.

(21) Appl. No.: 13/788,259

(22) Filed: Mar. 7, 2013

(65) Prior Publication Data

US 2013/0198747 A1 Aug. 1, 2013

Related U.S. Application Data

(63) Continuation of application No. 12/381,065, filed on Mar. 5, 2009, now Pat. No. 8,407,699.

(51) Int. Cl.
 *G06F 9/455* (2006.01)
 *G06F 9/46* (2006.01)
 *G06F 21/53* (2013.01)
 *G06F 12/14* (2006.01)

(52) U.S. Cl.
 CPC ...... *G06F 9/45533* (2013.01); *G06F 9/45558* (2013.01); *G06F 9/468* (2013.01); *G06F 21/53* (2013.01); *G06F 12/1491* (2013.01); *G06F 2009/45587* (2013.01); *G06F 2221/2105* (2013.01); *G06F 2221/2141* (2013.01); *G06F 2221/2149* (2013.01)

(58) Field of Classification Search
None
See application file for complete search history.

(56) References Cited

U.S. PATENT DOCUMENTS

| 7,424,709 | B2 | 9/2008 | Neiger et al. |
| 2002/0147810 | A1 | 10/2002 | Traversat et al. |
| 2005/0021788 | A1 | 1/2005 | Tucker et al. |
| 2005/0149726 | A1* | 7/2005 | Joshi ............... G06F 21/51 713/164 |

(Continued)

*Primary Examiner* — George Giroux
(74) *Attorney, Agent, or Firm* — Banner & Witcoff, Ltd.

(57) ABSTRACT

A computing system is configured to use a trampoline to isolate sensitive code in a virtual environment and in other applications. An import table may describe the entry points of a privileged code module or driver that generates privileged code. A system and method loads a shadow kernel to facilitate isolating the linkage between drivers and the rest of the system. The shadow kernel may be a copy of the operating system kernel that does not have the same integral position in the operation of the computing device. The shadow kernel may be used as a template for creating a jump table to redirect more critical privileged resource access requests from specially loaded kernel mode drivers to the PVM. All requests may pass through the PVM, which redirects non-critical functions to the original kernel. Multiple copies of a given driver or code module may be loaded in a given session.

20 Claims, 9 Drawing Sheets

(56) References Cited

U.S. PATENT DOCUMENTS

| | | |
|---|---|---|
| 2006/0069828 A1 | 3/2006 | Goldsmith |
| 2007/0050763 A1 | 3/2007 | Kagan et al. |
| 2007/0050770 A1 | 3/2007 | Geisinger |
| 2007/0283324 A1* | 12/2007 | Geisinger ........... G06F 9/45537 717/120 |
| 2008/0104589 A1 | 5/2008 | McCrory et al. |
| 2009/0025006 A1 | 1/2009 | Waldspurger |
| 2009/0288074 A1* | 11/2009 | Carroll ................ G06F 11/3466 717/158 |

\* cited by examiner

SYSTEM AND METHOD FOR MANAGING CODE ISOLATION

CROSS-REFERENCE TO RELATED APPLICATIONS

This application is a continuation application of and claims priority to co-pending U.S. patent application Ser. No. 12/381,065, filed on Mar. 5, 2009, and having the same title.

The present application is related by subject matter to U.S. Nonprovisional patent application Ser. No. 11/525,727, filed on Sep. 22, 2006, entitled "Dynamic Table Configuration in a Virtual Machine."

Each of the foregoing patent applications is incorporated herein by reference in its entirety.

FIELD OF THE INVENTION

This invention relates generally to managing computing resources and more specifically to a system and method for managing code isolation of privileged code.

SUMMARY OF THE INVENTION

A system for managing resources in a computing device comprises: a processor; a manager operably connected to the processor; a host environment controllable by the manager, said host environment comprising privileged code; and an isolated environment controllable by the manager, the isolated environment being configured to isolate the privileged code of the host environment.

A system for managing resources in a virtual machine comprises: a processor; a virtual machine manager operably connected to the processor; a host environment controllable by the virtual machine manager; an application coupled to the host environment and configured to generate a non-privileged resource request; a privileged driver, said privileged driver being configured to issue a privileged resource request to an API; a process virtual machine (PVM) configured to receive the privileged resource request from the privileged driver and to receive the non-privileged resource request from the application, the PVM being further configured to modify one or more of the privileged resource request and the non-privileged resource request to create one or more modified resource requests; and an operating system (OS) kernel configured to provide a response upon receipt from the PVM of one or more modified resource requests from the PVM.

A method for managing resources in a virtual machine comprises: issuing a privileged resource request to an API, by a privileged driver; receiving the privileged resource request, by a PVM; modifying the privileged resource request, by the PVM; receiving the modified resource request, by an OS kernel; acting on the modified resource request according to OS rules, by the OS kernel; receiving the transmitted action from the OS kernel, by a device driver associated with a device; performing functions associated with the action, according to driver rules, by the device driver; and receiving and storing or otherwise disposing of the modified resource request, by a disk operably connected with the device driver.

A method for managing resources in a virtual machine comprises: issuing a privileged resource request to an API by a privileged driver; receiving the privileged resource request by a PVM; modifying the privileged resource request by the PVM; receiving the modified resource request by an OS kernel; and providing a response by the OS kernel upon receipt from the PVM of one or more modified resource requests by the OS kernel.

A computer-readable storage medium having embodied thereon a program, the program being executable by a computer to perform a method for capturing and sending data that comprises: issuing a privileged resource request to an API by a privileged driver; receiving the privileged resource request by a PVM; modifying the privileged resource request by the PVM; receiving the modified resource request by an OS kernel; and providing a response by the OS kernel upon receipt from the PVM of one or more modified resource requests by the OS kernel.

DETAILED DESCRIPTION OF THE INVENTION

Virtual machines (VMs) allow a computer to simultaneously support two or more computing environments. A computer environment comprises the operating system, user applications and data. A VM is configured to "borrow" computing resources (such as CPU, disk, or memory) from a host computer, such that the VM may co-exist alongside the host computer as a guest computer.

Due to a large software footprint, current VMs cannot be easily transported from one host computer to another host computer. To be portable, the VM may include the capability to adapt to a given host environment and reconfigure its resources based on the presence or absence of hardware and/or operating system resources on the host system. Additionally, to protect the integrity of the resources and promote their proper functionality, the resources on the guest computer may remain isolated from the resources on the host computer, and vice-versa.

When a VM accesses operating system resources on the host computer, the host computer isolates certain operating system resources, e.g., the file system, registry, kernel objects and/or services from the guest computer.

The embodiments discussed herein are illustrative of one example of the present invention. As these embodiments of the present invention are described with reference to illustrations, various modifications or adaptations of the methods and/or specific structures described may become apparent to those skilled in the art. All such modifications, adaptations, or variations that rely upon the teachings of the present invention, and through which these teachings have advanced the art, are considered to be within the scope of the present invention. Hence, these descriptions and drawings should not be considered in a limiting sense, as it is understood that the present invention is in no way limited to only the embodiments illustrated.

Generally, the responsibility of an arbitrary VMM is to detect and mitigate (or virtualize) access to abstract resources. In hypervisor/hardware based VMMs, resource access is detected by trapping processor instructions that may otherwise cause unexpected errors or system corruption if allowed to execute unmodified. These requests are transformed by the VMM into harmless requests or emulated to ensure inconsistencies do not occur in the system. In process virtual machines (PVMs), the virtual machine monitor executes in a configuration that is much more tightly coupled with the underlying operating system, and typically execute with peer privilege with respect to the operating system itself. In contrast, hypervisor/hardware based virtual machine monitors typically executes with supervisory privilege, providing the hypervisor/hardware based VMM with a conceptually easy way to mitigate the aforementioned improper resource access requests.

The fact that PVMs are peers of the operating system makes it extremely challenging for PVMs to virtualize all resource requests in the system since there are many ways in which a resource access might escape detection. By operating in conjunction with the operating system, it is usually simple for the PVM to intercept accesses from user mode (non-privileged) applications. However, when faced with privileged code (e.g., privileged drivers or other kernel mode code), the traditionally accepted ways in which PVMs operate become unusable.

Virtual Machine Handling of Shared Code

Most software programs share a large amount of common code. In a given set of software programs, this common code might include: code to manipulate files, such as creating files, closing files, writing to or reading from files, and the like; code to print data to the screen or other input/output (I/O) device; code to perform mathematical functions, such as square root, and the like; code that provides implementation of common data structures, such as trees, linked lists, and the like; code that manages threads; and other common code.

Since the code to perform these types of operations is common, such common code may be shared between programs and thus reduce memory consumption in the system. To accomplish this technique, the operating system in question may provide shared libraries. Shared libraries may include a set of code modules that contain the common code described above.

In some operating systems, the list of externally required functions required by a software program is known as the import table. The import table may comprise a list of all code routines/functions that are missing from the software program executable code module, yet are required by the module. As the software program is executed, the operating system examines the import table for an application and resolves missing code functions by dynamically linking against the shared library. The shared library may contain the implementation code for these common functions. The process that the operating system uses to resolve missing code functions against a shared library is called symbol resolution.

At the conclusion of symbol resolution, the software program is completely resolved, meaning there are implementations present for all code routines required by the program to properly function. At this point, the operating system begins execution of the program.

During the program's execution, the program may request accesses to physical or logical resources, such as the disk drive or screen. In typical computer systems, this request is passed to the operating system kernel, which then fulfills the request for the program. In modern operating systems, all resource access is managed by the kernel, in order to prevent two programs from accidentally modifying the same resource concurrently, and in order to prevent malicious or buggy programs from accessing sensitive system resources.

The operating system may provide a standard way for programs to pass requests to the kernel. In typical operating systems, this capability is implemented as a system call dispatcher, a code routine that may be called by the program. The system call dispatcher is configured to receive the request from the program and to deliver it to the kernel via some operating system specific means.

Figure 1:
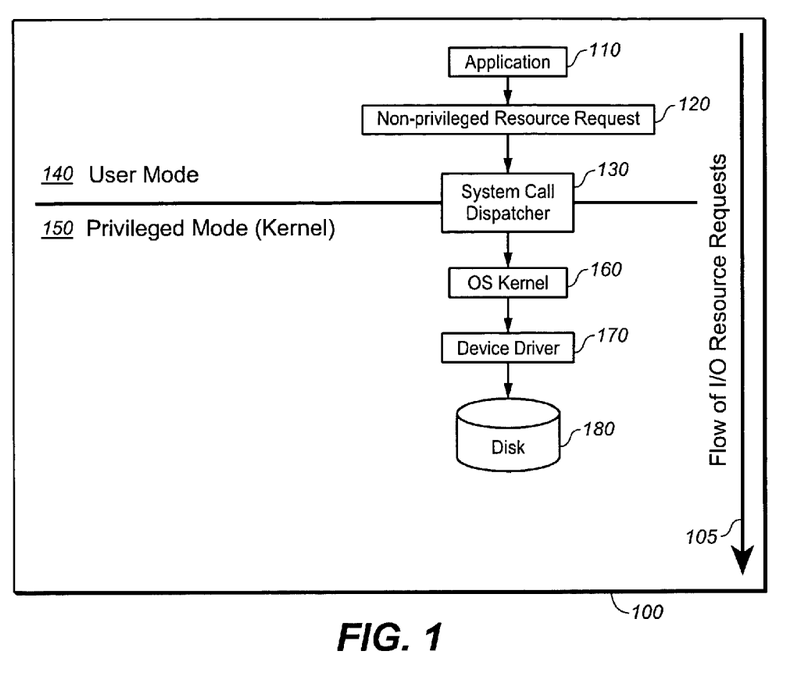
FIG. 1 is an illustration of a flow diagram of a system call dispatcher in an operating system managing a flow of operations stemming from a request originating in non-privileged code.

FIG. 1 depicts a flow diagram 100 of steps by which a system call dispatcher in an operating system may manage a flow of operations stemming from a request originating in non-privileged code.

The flow of I/O requests is downward on the page as illustrated by an arrow 105. An application 110 may respond to a need created either by input or by its own requirements. The application 110 may issue a non-privileged resource request 120 originating in non-privileged code to an API. The application 110 may pass the non-privileged resource request 120 to a system call dispatcher 130. The system call dispatcher 130 may be located on both sides of the boundary between non-privileged user mode 140 and privileged mode 150, also known as kernel mode 150. The system call dispatcher 130 may pass non-privileged resource request 120 to the operating system kernel 160.

Once the request is received by the kernel 160, the kernel 160 may fulfill the request, deny it, or take any number of other actions. Whatever action the kernel 160 takes is transmitted to the appropriate device driver 170, which then directs an associated device to perform one or more functions associated with the action. The device driver 170 then forwards resulting output to disk 180 for storage or other final disposition. Eventually, the program is notified that the request is completed.

Figure 2:
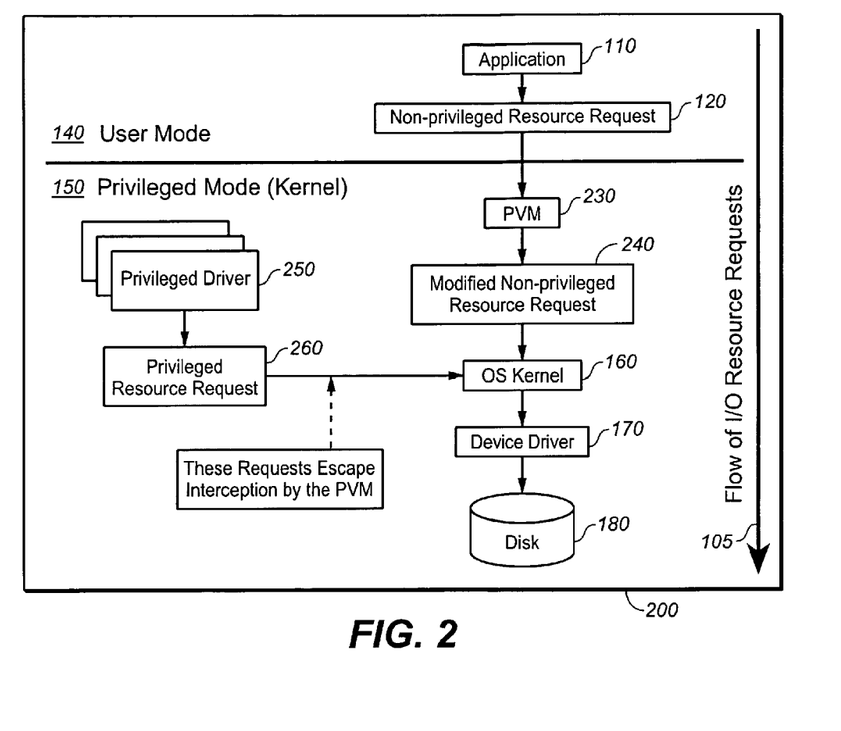
FIG. 2 is an illustration of a flow diagram of a process virtual machine in an operating system managing a flow of operations stemming from a request originating in non-privileged code and from a request originating in privileged code, showing that privileged code may escape virtualization.

FIG. 2 depicts a flow diagram 200 of steps by which a process virtual machine in an operating system manages a flow of operations stemming from a request originating in non-privileged code and from a request originating in privileged code. Throughout this document, like-numbered elements are like elements. As we will see, privileged code may escape virtualization.

Again, the flow of I/O requests is downward on the page as illustrated by an arrow 105. The application 110 and the resource request 120 of FIG. 1 are also shown in FIG. 2. Application 110 may pass a non-privileged resource request 120 originating in non-privileged code to a process virtual machine (PVM) 230. The PVM 230 may be located on the privileged side of the boundary between non-privileged user mode 140 and privileged mode 150. The PVM 230 inserts itself into the request processing pipeline, intercepting the non-privileged request 120 prior to its reaching a kernel 160 and modifying it to create a modified non-privileged resource request 240. The PVM 230 may virtualize the non-privileged resource request 120 by altering the non-privileged resource request 120 to an alternate namespace, or otherwise modifying it. The modification may be based on a table of rules. The modification creates modified non-privileged resource request 240.

The PVM 230 may pass the non-privileged resource request 120 to operating system kernel 160. Once modified non-privileged resource request 240 is received by kernel 160, kernel 160 may fulfill the modified non-privileged request 240, deny it, or take any number of other actions. Whatever action kernel 160 takes may be transmitted to the appropriate device driver 170, which then directs an associated device to perform any functions associated with the action. Device driver 170 then forwards resulting output to disk 180 for storage or other final disposition. Eventually, the program is notified that the request is completed.

However, the same PVM-mediated interception technique cannot be applied to privileged code (kernel mode). Throughout this application, the term "privileged driver" shall be used to refer interchangeable to a driver located in privileged space and/or originating in privileged code, and a code module located in privileged space and/or comprising privileged code. When a privileged driver 250 is loaded into the system, it will generate a privileged resource request 260 to an API that may be dynamically transmitted directly to operating system kernel 160. This means that privileged resource request 260 will not pass through PVM 230. Once privileged resource request 260 is received by kernel 160, kernel 160 may fulfill privileged request 260, deny it, or take any number of other actions. Whatever action kernel 160 takes may be transmitted to the appropriate device driver 170, which then may direct an associated device to perform any functions associated with the action. Device driver 170 then may forward any resulting output to disk 180 for storage or other final disposition.

Figure 3:
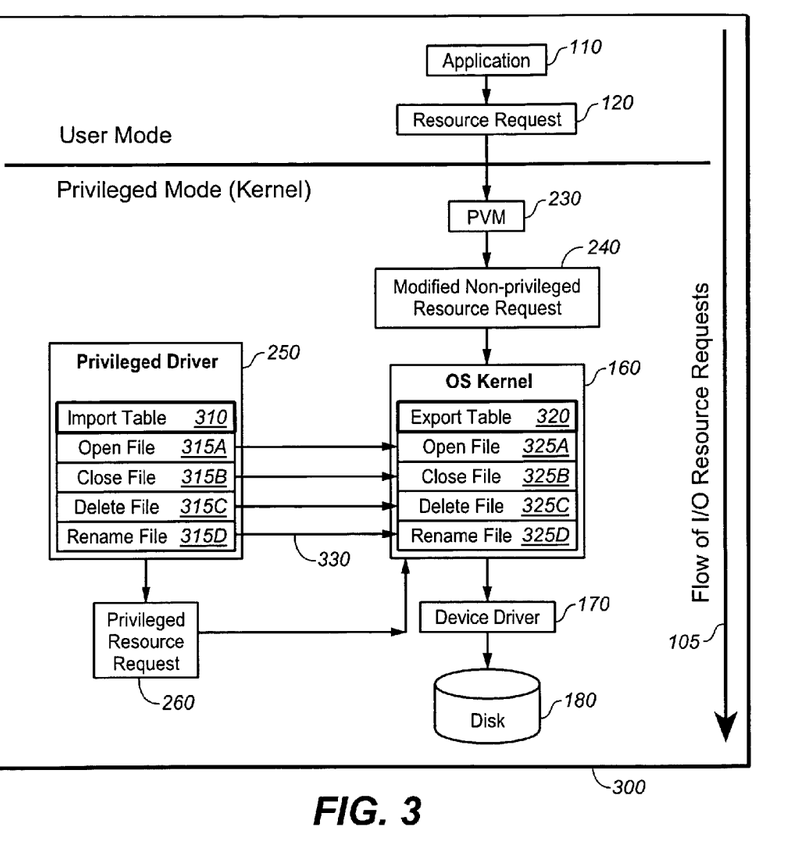
FIG. 3 is an illustration of a block diagram of a system that resolves a privileged driver's import table against the operating system kernel, resulting that calls made by the privileged driver may bypass the PVM.

As illustrated in FIG. 3, the architectural structure of modern operating systems prevents application of the PVM-mediated interception technique to privileged code stems from the architectural structure of modern operating systems, as illustrated in FIG. 3. FIG. 3 is an illustration of a block diagram of a system 300 that resolves a privileged driver's import table against the operating system kernel, resulting that any calls made by the privileged driver will bypass the PVM. When a privileged code module or privileged driver is loaded into the system, it may dynamically link directly against the operating system kernel.

The flow of I/O requests is downward on the page as illustrated by arrow 105. Application 110 may respond to a need created either by input or by its own requirements. The application 110 may issue a non-privileged resource request 120. The application 110 may pass a non-privileged resource request 120 originating in non-privileged code to process virtual machine (PVM) 230. PVM 230 may be located on the privileged side of the boundary between non-privileged user mode 140 and privileged mode 150. The PVM 230 inserts itself into the request processing pipeline, intercepting the non-privileged request 120 prior to its reaching kernel 160 and modifying it to create a modified non-privileged resource request 240. The PVM 230 may virtualize non-privileged resource request 120 by altering non-privileged resource request 120 to an alternate namespace, or otherwise modifying it based on a table of rules, thereby creating modified non-privileged resource request 240.

PVM 230 may pass modified non-privileged resource request 240 to operating system kernel 160. Once modified non-privileged resource request 240 is received by kernel 160, kernel 160 may read export table 320 in response to instructions contained in privileged resource request 260. Export table 320 may comprise export table instructions 325A-325D, e.g., open file, close file, delete file, rename file, and the like. Using export table 320, kernel 160 may fulfill modified non-privileged request 240, deny it, or take any number of other actions. Whatever action kernel 160 takes may be transmitted to the appropriate device driver 170, which then directs an associated device to perform any functions associated with the action. Device driver 170 then forwards any resulting output to disk 180 for storage or other final disposition.

However, the same PVM-mediated interception technique cannot be applied to privileged code (kernel mode). Privileged driver 250 may comprise import table 310. Import table 310 may comprise import table instructions 315A-315D, e.g., open file, close file, delete file, rename file, and the like. Import table instructions 315A-315D may be different from export table instructions 325A-325D. Privileged driver 250 may generate privileged resource request 260. Privileged resource request 260 and import table 310 may be dynamically transmitted over linkage 330 directly to operating system kernel 160. This means that privileged resource request 260 will not pass through PVM 230.

Once privileged resource request 260 and import table 310 are received by kernel 160, kernel 160 may read export table 320 in response to instructions contained in privileged resource request 260 and the import table 310 that helped generate it. Using export table 320, kernel 160 may fulfill privileged resource request 260, deny it, or take any number of other actions. Whatever action kernel 160 takes may be transmitted to the appropriate device driver 170, which then directs an associated device to perform any functions associated with the action. Device driver 170 then forwards any resulting output to disk 180 for storage or other final disposition. Eventually, the program is notified that the request is completed.

In sum, requests issued by the privileged driver will result in execution of code in the OS kernel, thus bypassing the PVM.

Figure 4:
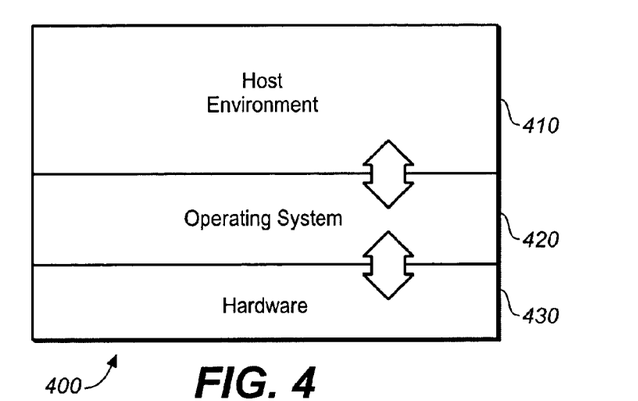
FIG. 4 is an illustration of a system for hosting a virtual machine in an exemplary implementation of the invention.

FIG. 4 is an illustration of a system for hosting a virtual machine in an exemplary implementation of the invention. Host system 400 comprises a host environment 410, an operating system 420, and hardware 430. Host environment 410 receives instruction from and transmits instructions to the operating system 420. Operating system 420 receives data and transmits instructions to the hardware 430.

Host environment 410 may comprise, for example, user applications and data files stored within a host memory. Host environment 410 may further access resources such as library files, configuration files, registries and/or or kernel objects. Examples of an operating system 420 include Windows® or Linux®. Hardware 430 may include hardware resources, e.g., ports, processors, memory, and input/output devices including, for example, a display, speakers, printers, a keyboard, and/or a mouse. In operation, a user may operate host system 400 as if host system 400 is a personal computer without a virtual machine. Host environment 410 may be substantially unaffected by the presence of a virtual machine.

Systems and methods are described herein to efficiently manage and enforce separation and isolation of sections of program code in a software program. This enables safeguarding of the integrity of sensitive code (particularly privileged code), protecting such resources and promoting their proper functionality. Specifically, this invention addresses key deficiencies in the current state of the art by illustrating new techniques for software API redirection. The invention may apply to any operating system-provided API call, including but not limited to blocking, non-blocking, and call-back registration calls. Software systems, such as operating systems or virtual machine monitors, may make effective use of the techniques described herein to enforce a new level of isolation between the objects that they manage.

Although the systems and methods described herein have universal applicability, we shall frame the discussion by focusing on one key area where these systems and methods may be extremely useful—virtual machine monitors (VMMs). In this area, the systems and methods described herein are used by a special form of VMM to provide a higher level of separation between operating environments.

The system and methods described in this invention impart a way for a PVM to mitigate access to privileged code, in order to provide a comparable level of isolation to that of a hypervisor/hardware based VMM.

One approach to solve this problem may make use of the PVM module's supervisory privilege. Since the PVM has peer privilege with the operating system kernel, it is possible for the PVM to modify the kernel's in-memory executable code, causing all APIs to be redirected to the PVM module. This approach may be disfavored for several reasons: The set of APIs required to intercept may be quite large. In-line patching of running code may lead to instability. In-line patching of running code may not be easily performed atomically, which would be required for this approach to work properly.

According to embodiments of the invention, all of these shortcomings of this possible approach may be avoided by use of the disclosed system and method for code isolation. Embodiments of the invention provide a generic method to force privileged kernel APIs to flow through the PVM, thus ensuring that requests coming from these modules may be inspected, and optionally transformed if required.

Figure 5:
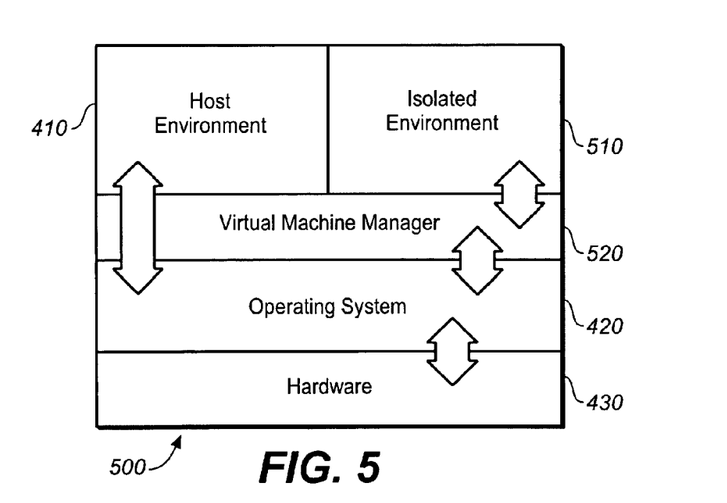
FIG. 5 is an illustration of a system comprising a virtual machine in an exemplary implementation of the invention.

FIG. 5 depicts a system 500 comprising a virtual machine according to an exemplary implementation of the invention. The system 500 uses the operating system 420 and the hardware 430 of host system 400 to execute applications within a portable guest environment. The system 500 may comprise host environment 410, operating system 420, hardware 430, an isolated environment 510, and a manager 520. The manager 520 may be a virtual machine manager (VMM) 520. Isolated environment 510 may receive instructions from and may transmit instructions to the VMM 520. VMM 520 is executed by a processor. The VMM 520 may interrupt instructions from operating system 420 and may transmit instructions to the operating system 420.

Figure 6:
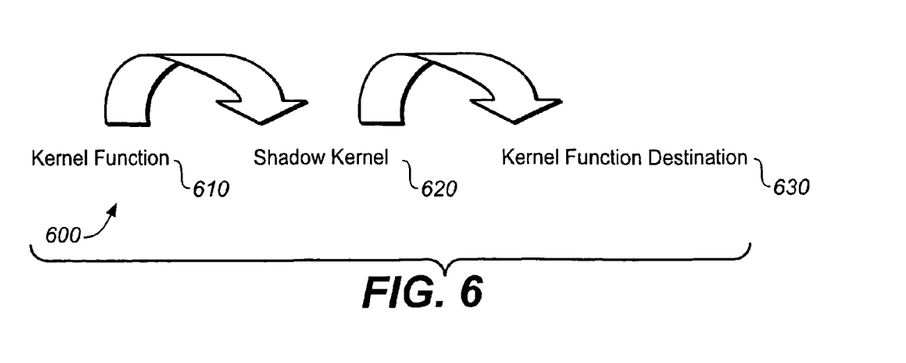
FIG. 6 is a conceptual illustration of a code trampoline that illustrates a set of embodiments wherein a second, shadow kernel is loaded.

FIG. 6 is a conceptual illustration of a code trampoline 600 that illustrates a set of embodiments of the invention wherein a second, shadow kernel is loaded. The term "trampoline" refers to an intermediary section of code consisting of a sequence of jump instructions directed to a genuine code target located elsewhere in memory or elsewhere in the system. Trampolines are usually implemented as jump tables. Jump tables are code that comprise a sequence of instructions to jump to various other places in memory. According to embodiments of the invention, a trampoline may be used to isolate privileged code.

A shadow kernel is a copy of the OS kernel that nevertheless does not have the same integral position in the operation of the computing device as the actual OS kernel. Accordingly, a shadow kernel may offer more robust execution of certain functions than may the OS kernel.

A shadow kernel is loaded into memory in the same fashion as a standard driver is. This is possible in most modern operating systems as the kernel binary file is structurally organized in a similar way to a driver binary file and has no external dependencies. The shadow kernel may serve as an intermediate jump destination that facilitates the privileged resource request's jump from the privileged driver to the PVM.

Shadow kernel 620 may determine whether an instruction that is called by privileged resource request 260 is a critical function. Shadow kernel 620 may be used as a template for creating the jump table required to redirect certain kernel functions to the PVM, while other non-critical functions may be redirected to the original kernel.

Kernel function 610 is redirected on the first jump of the trampoline to shadow kernel 620, which then redirects a second jump for kernel function 610 to a kernel function destination 630. The kernel function destination 630 may be PVM 230 (not pictured) for critical functions. The kernel function destination 630 may be original kernel 160 (not pictured) for non-critical functions.

Figure 7:
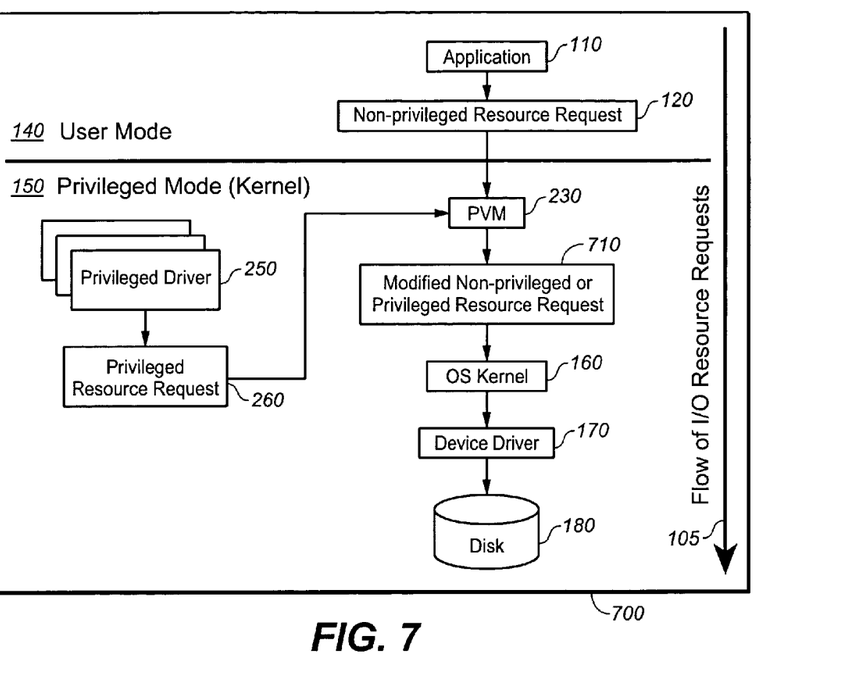
FIG. 7 is an illustration of a flow diagram of a system that routes privileged resource access requests from specially loaded kernel mode drivers through the PVM for processing, in an exemplary implementation of the invention. All requests, privileged and non-privileged, pass through the PVM.

FIG. 7 depicts a flow diagram 700 of steps by which a process virtual machine in an operating system may manage a flow of operations stemming from a request originating in non-privileged code and from a request originating in privileged code. According to embodiments of the invention, both non-privileged and privileged requests pass through the PVM and are virtualized.

The flow of I/O requests is downward on the page as illustrated by arrow 105. As above, application 110 may respond to a need created either by input or by its own requirements and may issue a non-privileged resource request 120 originating in non-privileged code. Application 110 may pass non-privileged resource request 120 to PVM 230. PVM 230 may intercept non-privileged request 120 prior to its reaching kernel 160 and may modify it to create a modified resource request 710. According to the present set of embodiments, privileged and non-privileged resource requests are treated the same. PVM 230 may virtualize non-privileged resource request 120 by altering non-privileged resource request 120 to an alternate namespace, or otherwise modifying it based on a table of rules, thereby creating modified resource request 710.

According to embodiments of the invention, the same PVM-mediated interception technique may be applied to privileged code (kernel mode). Resource access requests from certain specially-loaded kernel mode drivers (or other privileged code) are routed through the PVM for processing. When a privileged driver 250 is loaded into the system, it will generate a privileged resource request 260 that will be transmitted directly to PVM 230. As with non-privileged resource request 120, PVM 230 may virtualize non-privileged resource request 120 by altering non-privileged resource request 120 to an alternate namespace, or otherwise modifying it based on a table of rules, thereby creating modified resource request 710.

PVM 230 may pass modified resource request 710 to operating system kernel 160. Once modified resource request 710 is received by kernel 160, kernel 160 may fulfill the modified resource request 710, deny it, or take any number of other actions. Whatever action kernel 160 takes may be transmitted to the appropriate device driver 170, which then directs an associated device to perform any functions associated with the action. Device driver 170 then may forward any resulting output to disk 180 for storage or other final disposition.

Figure 8:
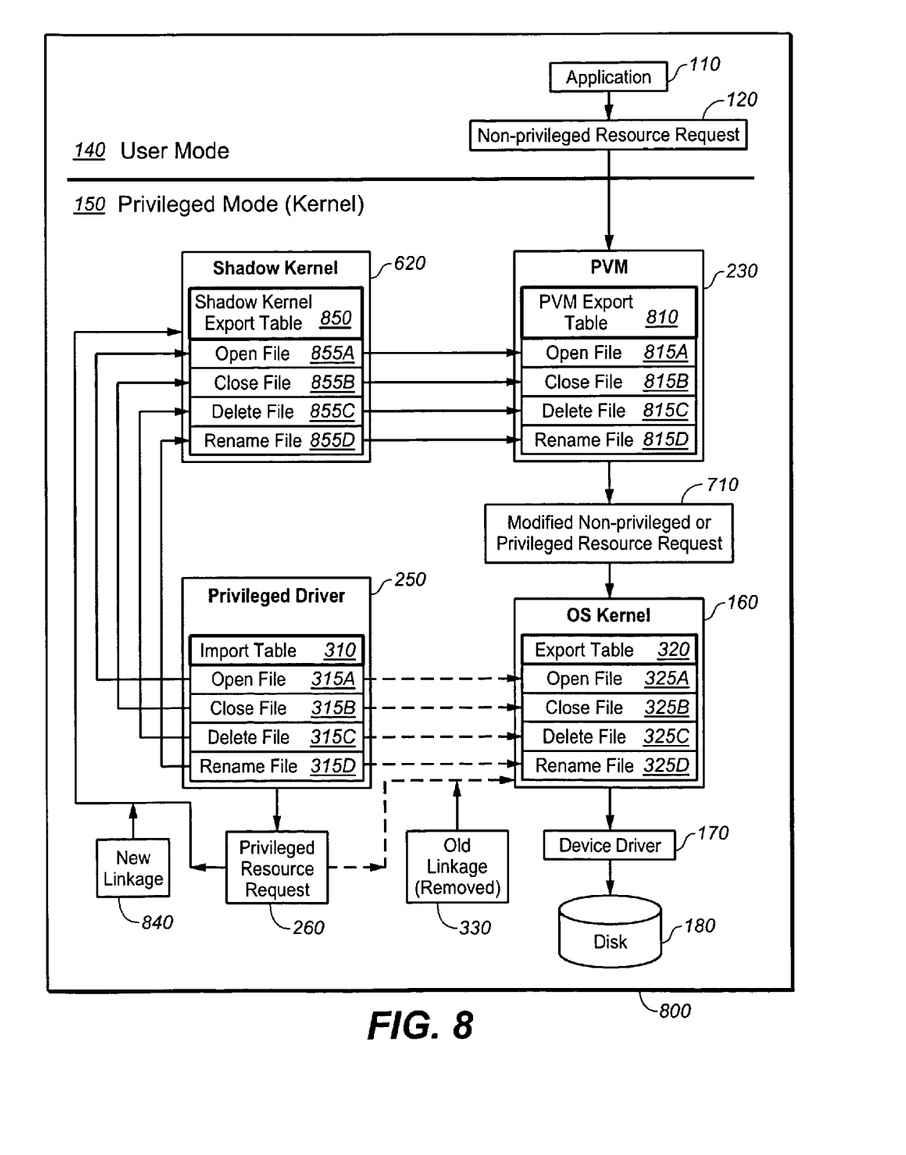
FIG. 8 is an illustration of a block diagram providing further detail on a system that loads a shadow kernel to facilitate code isolation of privileged code. All requests, privileged and non-privileged, pass through the PVM.

FIG. 8 depicts a block diagram providing further detail on a system 800 that loads a shadow kernel to facilitate code isolation of privileged code. All requests, privileged and non-privileged, pass through the PVM.

The system 800 resolves a privileged driver's import table against the shadow kernel, resulting that any calls made by the privileged driver will pass through the PVM.

The application 110 may respond to a need created either by input or by its own requirements. The application 110 may issue a non-privileged resource request 120. Application 110 may pass a non-privileged resource request 120 to PVM 230. PVM 230 is located on the privileged side of the boundary between non-privileged user mode 140 and privileged mode 150, also known as kernel mode 150. Once non-privileged resource request 120 is received by PVM 230, PVM 230 may read PVM export table 810 in response to instructions contained in non-privileged resource request 120 and any privileged resource requests 260 that may have already been received from the shadow kernel 620. PVM export table 810 may comprise PVM export table instructions 815A-815D, e.g., open file, close file, delete file, rename file, and the like. Using PVM export table 810, PVM 230 intercepts non-privileged request 120 prior to its reaching kernel 160 and modifies it to create a modified resource request 710. PVM 230 may virtualize non-privileged resource request 120 by altering non-privileged resource request 120 to an alternate namespace, or otherwise modifying it based on a table of rules, thereby creating the modified resource request 710.

According to embodiments of the invention, the same VM-mediated interception technique may be applied to privileged code (kernel mode). Privileged driver 250 may comprise import table 310. According to embodiments of the invention, the import table 310 may describe the entry points of the privileged driver 250. Privileged driver 250 generates privileged resource request 260. Previously, privileged resource request 260 and import table 310 would typically have been dynamically transmitted directly to operating system kernel 160 via an old linkage 330, which is removed according to embodiments of the invention and replaced with new linkage 840. The privileged resource request 260 and the import table 310 pass through the new linkage 840 to the shadow kernel 620.

Once the privileged resource request 260 is received by shadow kernel 620, using shadow kernel rules, the shadow kernel 620 may read shadow kernel export table 850 in response to instructions contained in privileged resource request 260 and the import table 310 that helped generate it. Shadow kernel rules may be predetermined by a user. Alternatively, or in addition, shadow kernel rules may be created "on the fly" during real-time operation of the invention.

Shadow kernel export table 850 may comprise shadow kernel export table instructions 855A-855D, e.g., open file, close file, delete file, rename file, and the like. Import table instructions 315A-315D, export table instructions 325A-325D, PVM export table instructions 815A-815D, and shadow kernel export table instructions 855A-855D may all be different from each other. Shadow kernel 620 may pass privileged resource request 260 and shadow kernel export table 850 to PVM 230.

The PVM 230 can read PVM export table 810 in response to instructions contained in privileged resource request 260 and the shadow kernel export table as well as any prior privileged resource requests 260 that may have already been received from shadow kernel 620. Using PVM export table 810, PVM 230 modifies privileged resource request 260 to create a modified resource request 710.

The PVM 230 may pass modified resource request 710 and PVM export table 810 to operating system kernel 160. Using OS rules, OS kernel 160 may generate export table 320 in response to instructions contained in modified resource request 710 and the PVM export table 810. OS rules may be predetermined by a user. Alternatively, or in addition, OS rules may be created "on the fly" during real-time operation of the invention.

The kernel 160 may fulfill the modified resource request 710, deny it, or take any number of other actions. Whatever action kernel 160 takes may be transmitted to the appropriate device driver 170. The device driver 170 then directs an associated device to perform any functions associated with the action. Device driver 170 then forwards any resulting output to disk 180 for storage or other final disposition.

In sum, requests issued by the privileged driver will result in a new linkage enabling execution of code in the PVM.

This system provides at least the following benefits:
1. The system provides a way for privileged drivers to be loaded in a way that isolates the APIs being used by the driver. This benefit is achieved through altering the import table of any isolated driver code.
2. The system provides a way for multiple copies of the same driver code to be loaded "side by side" in the same system.
3. The system provides a way to load into the system a second operating system kernel, the shadow kernel.
4. The system provides a way for all drivers loaded in the isolated space to be resolved against each other and the shadow kernel.

Shadow Kernel Implementation

In the Microsoft® Windows® operating system, shadow kernel implementation may be accomplished through the following sequence of actions:
1. Generate a service entry for a fictitious driver. This service entry may be named arbitrarily, but typically contains the word "kernel" to make readability easier. The binary payload file associated with this shadow kernel points to the same binary file as the system kernel, typically "ntoskrnl.exe."
2. Issue a ZwLoadDriver( . . . ) API call to load the fictitious driver.
3. Handle any ambiguities introduced during the load process such as calling the driver entry API.

At this point, the system has a second kernel loaded into memory, but it has not yet been initialized. For the purposes of the embodiment illustrated in FIG. 8, this is acceptable. However, in an alternate embodiment, the state of the system kernel may be shared with the shadow kernel by performing the additional steps:

1. Identify the system kernel's data pages. This may be done by static code analysis or via run-time introspection of the running kernel. These data pages are typically easily identifiable.
2. Map the system kernel's data segment page table entries to those of the shadow kernel. In the case of operating systems with architecture designed by Intel®, this may be accomplished by de-referencing the address stored in the CR3 register and performing the appropriate page table and page directory manipulation using the shadow kernel's pages, whose addresses are previously known.

Figure 9:
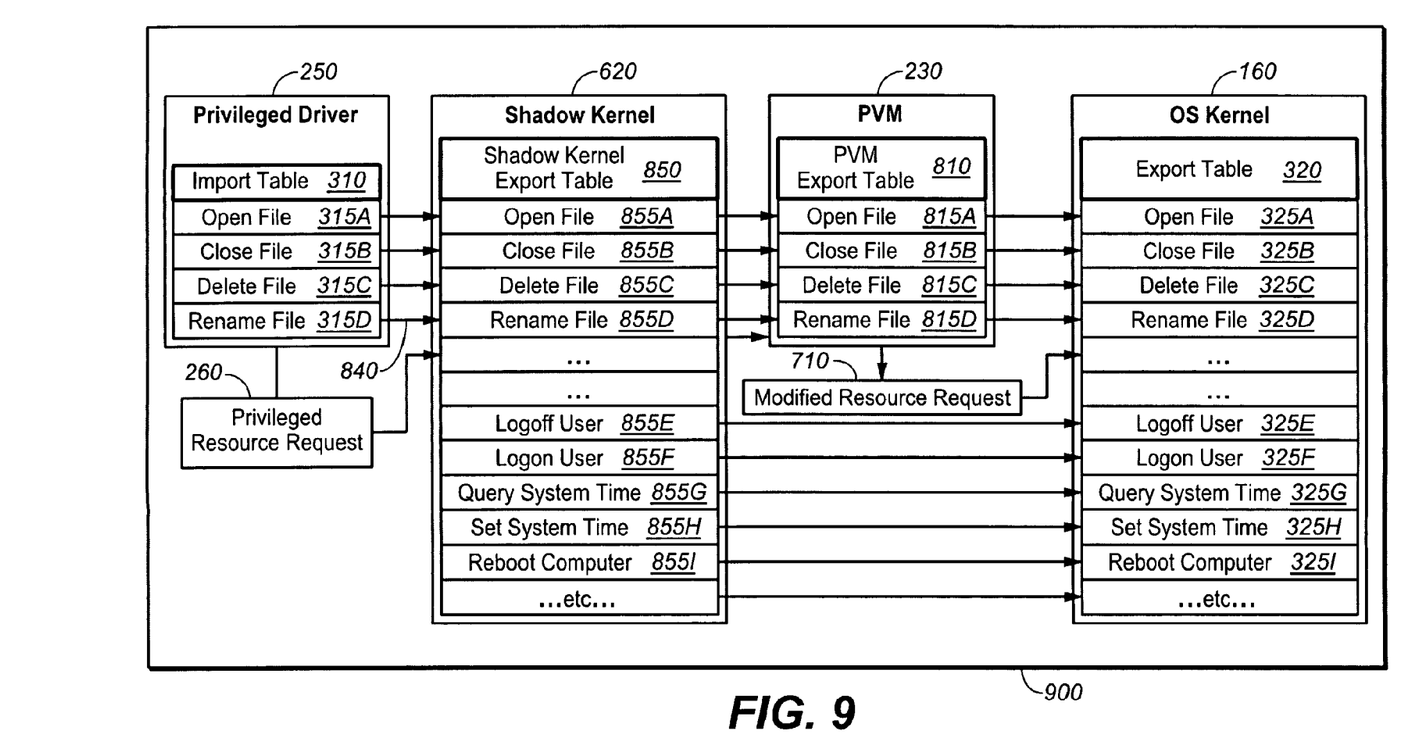
FIG. 9 is an illustration of a flowchart providing further detail on a code trampoline employing an import table to isolate a privileged driver in an exemplary embodiment of the invention.

By utilizing a second, shadow kernel, we can create an in-place template-based trampoline, as illustrated in FIG. 9.

FIG. 9 is an illustration of a flowchart providing further detail on a system 900 employing a code trampoline and an import table to isolate a privileged driver in an exemplary embodiment of the invention. As shown in this figure, loading a shadow kernel facilitates the isolation of the linkage between isolated drivers and the rest of the system. When a privileged driver 250 is loaded into the system, it will generate a privileged resource request 260. The trampoline may be used to appropriately redirect privileged resource request 260 to an appropriate destination.

The privileged driver 250 may comprise import table 310. Import table 310 comprises import table instructions 315A-315D, e.g., open file, close file, delete file and rename file.

As discussed above, a trampoline may be implemented as a jump table and used to isolate privileged code. Jump tables comprise a sequence of instructions to jump to various other places in a computing system.

The privileged driver 250 may direct the privileged resource request 260 and the import table 310 to jump through the new linkage 840 to the shadow kernel 620.

Using shadow kernel rules, shadow kernel 620 may create a shadow kernel export table 850 in response to instructions contained in privileged resource request 260 and the import table 310, as well as any previously received privileged resource requests 260.

The shadow kernel export table 850 comprises shadow kernel export table instructions 855A-855I, e.g., open file, close file, delete file, rename file, logoff user, logon user, query system time, set system time, reboot computer, and the like.

The shadow kernel 620 may determine whether an instruction in shadow kernel export table 850 that is called by privileged resource request 260 is a critical function, ie., one that is also comprised in PVM export table 810. If the answer is yes, then the shadow kernel 620 may direct the privileged resource request 260 and the shadow kernel export table to jump to PVM 230, as disclosed in further detail in FIG. 8. If the answer is no, then the shadow kernel 620 may direct the privileged resource request 260 to jump to the OS kernel 160, which comprises the export table 320.

For example, with reference to the shadow kernel export table 850 depicted in FIG. 9, upon the direction of privileged resource request 260 to shadow kernel export table 850, privileged resource request 260 may call a shadow kernel export table instruction 855. If the called shadow kernel export table instruction 855 is one of shadow kernel export table instructions 855A-855D, e.g., open file, close file, delete file, rename file, and the like, these shadow kernel export table instructions 855 are also comprised in PVM export table 810 as PVM export table instructions 815A-815D. Typically, these instructions also comprised in PVM 230 will be of a more critical nature. Accordingly, in these cases, the shadow kernel 620 may redirect privileged resource request 260 and a copy (not shown) of the shadow kernel export table 850 to jump to PVM 230.

On the other hand, if the shadow kernel export table instruction 855 called by the privileged resource request 260 in the shadow kernel export table 850 is one of shadow kernel export table instructions 855E-855I, e.g., logoff user, logon user, query system time, set system time, and reboot computer, these instructions are not comprised in PVM export table 810. Typically, these instructions will be non-critical. Accordingly, in these cases, shadow kernel 620 may redirect the privileged resource request 260 and a copy (not shown) of the shadow kernel export table 850 to jump directly to the OS kernel 160.

Once the critical privileged resource request 260 and the copy of shadow kernel export table 850 are received by PVM 230, the PVM 230 may create a PVM export table 810 in response to instructions contained in privileged resource request 260 and the copy of shadow kernel export table 850. The PVM 230 may intercept the privileged resource request 260 prior to its reaching the kernel 160 and may modify it to create a modified resource request 710. The PVM 230 may virtualize the privileged resource request 260 by altering privileged resource request 260 to an alternate namespace, or otherwise modifying it based on a table of rules, thereby creating modified resource request 710. PVM 230 may redirect modified resource request 710 and PVM export table 810 to jump to operating system kernel 160.

Export table 320 may comprise export table instructions 325A-325I, e.g., open file, close file, delete file, rename file, logoff user, logon user, query system time, set system time, reboot computer, and the like. In this example, export table instructions 325A-325D, e.g., open file, close file, delete file, and rename file, are critical instructions and export table instructions 325E-325I, e.g., logoff user, logon user, query system time, set system time, and reboot computer are non-critical instructions. Import table instructions 315A-315D, shadow kernel export table instructions 855A-855I, PVM export table instructions 815A-815D, and export table instructions 325A-325I may all be different from each other.

Once OS kernel 160 receives either 1) a non-critical privileged resource request 260 and shadow kernel export table 850, or 2) a modified resource request 710 and PVM export table 810, the OS kernel 160 may, as above, read export table 320 in response to instructions contained in the resource request and the export table. Using the export table 320, the kernel 160 may fulfill privileged request 260, deny it, or take any number of other actions. Once the modified resource request 710 is received by the kernel 160, the kernel 160 may fulfill the modified resource request 710, deny it, or take any number of other actions. Whatever action the kernel 160 takes may be transmitted to the appropriate device driver 170, which then may direct an associated device to perform any functions associated with the action. The device driver 170 may then forward any resulting output to the disk 180 for storage or other final disposition.

In sum, requests issued by the privileged driver will result in a new linkage enabling execution of code in the PVM. Critical functions may be directed to the shadow kernel and non-critical functions may be directed to the OS kernel.

Figures 10, 10A:
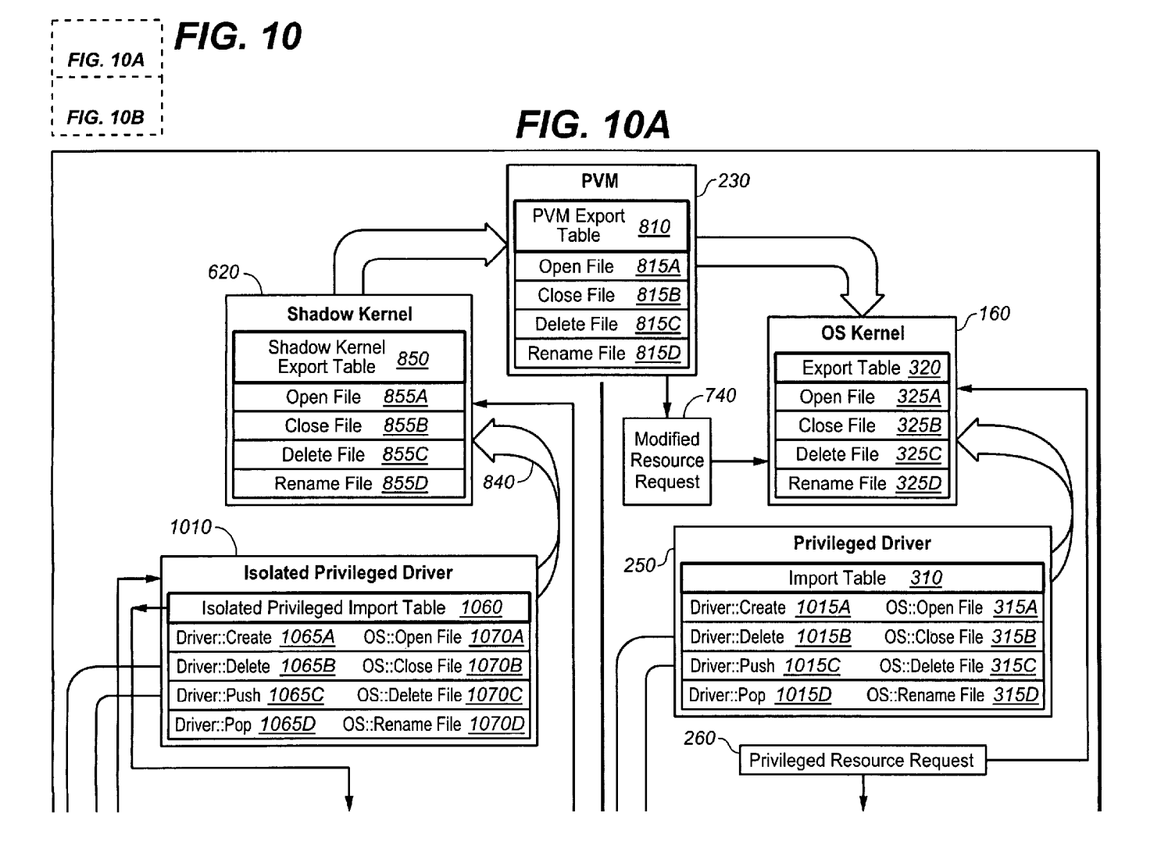
FIG. 10 is an illustration of a flowchart for symbol resolution hierarchy in an exemplary implementation of the invention.
Figure 10B:
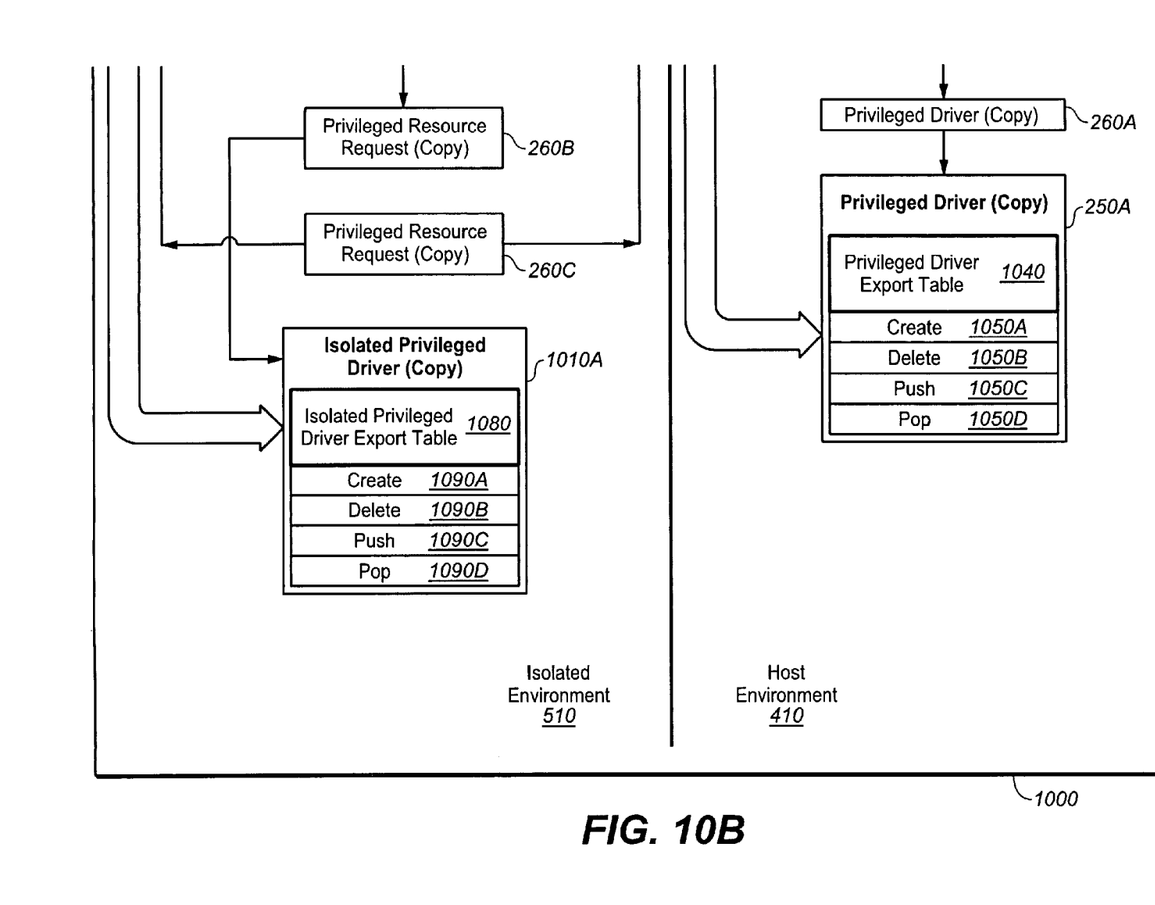

By using the steps described above, import table modification may be used to construct a symbol resolution hierarchy such as in FIG. 10. In this hierarchy, it is easily demonstrable that there are no functions directly linked to the original system kernel or drivers, unless those functions are expressly permitted to be linked. Using this approach, it is possible to completely isolate a driver stack or hierarchy from the same or similar stack or hierarchy loaded on the host computer.

FIG. 10 is an illustration of a block diagram providing further detail on a system 1000 which uses multiple trampoline jumps to move a privileged resource request 260 from an isolated environment 510 in which privileged drivers are insulated through code isolation to a host environment 410, while maintaining an isolated copy of the privileged driver.

When privileged driver 250 is loaded into host environment 410, an isolated copy 1010 may be loaded into isolated environment 510 according to embodiments of the invention. The privileged driver 250 may comprise the import table 310.

The privileged driver 250 may direct the privileged resource request 260 and the import table 310 to jump to the OS kernel 160. Once the OS kernel 160 has received the privileged resource request 260 and the import table 310, using OS rules, the OS kernel 160 may fulfill the privileged resource request 260, deny it, or take any number of other actions.

The import table 310 may comprise privileged driver instructions 1015A-1015D, e.g., create, delete, pop, and push, and the like. The import table 310 also may comprise import table OS instructions 315A-315D, e.g., open file, close file, delete file, and rename file. The import table 310 thus facilitates "translation" between privileged driver instructions 1015A-1015D and import table OS instructions 315A-315D. For example, import table 310 may comprise one or more of a privileged driver instruction 1015A "create" that translates to an import table OS instruction 315A "open file," a privileged driver instruction 1015B "delete" that translates to an import table OS instruction 315B "close file," a privileged driver instruction 1015C "push" that translates to an import table OS instruction 315C "delete file," and a privileged driver instruction 1015D "pop" that translates to an import table OS instruction 315D "rename file."

Operating in host environment 410, the privileged driver 250 may create a copy 250A of itself which it may jump to a secure location in host environment 410. The privileged driver 250 may then create a copy 260A of privileged resource request 260, which may be provided to copy 250A along with import table 310. Once the privileged resource request copy 260A and the import table 310 are received by the privileged driver copy 250A, the copy 250A may read a privileged driver export table 1040, in response to instructions contained in privileged resource request copy 260A and import table 310. The privileged driver export table 1040 may in turn comprise isolated privileged export table instructions 1050A-1050D, e.g., create, delete, push, pop, and the like. Such a destination would be particularly appropriate for a non-critical function.

The isolated privileged driver 1010 may comprise isolated privileged import table 1060. The isolated privileged import table 1060 may comprise isolated privileged driver instructions 1065A-1065D, e.g., open file, close file, delete file, rename file, and the like. Isolated privileged import table 1060 also may comprise isolated privileged OS instructions 1070A-1070D, e.g., create, delete, push, pop, and the like. Isolated privileged import table 1060 thus facilitates "translation" between isolated privileged driver instructions 1065A-1065D and isolated privileged OS instructions 1070A-1070D. For example, isolated privileged import table 1060 may comprise one or more of an isolated privileged driver instruction 1065A "create" that translates to an isolated privileged OS instruction 1070A "open file," an isolated privileged driver instruction 1065B "delete" that translates to an isolated privileged OS instruction 1070B "close file," an isolated privileged driver instruction 1065C "push" that translates to an isolated privileged OS instruction 1070C "delete file," and an isolated privileged driver instruction 1065D "pop" that translates to an isolated privileged OS instruction 1070D "rename file."

Operating in isolated environment 510, isolated privileged driver 1010 may create a copy 260B of privileged resource request 260, and may further create a copy 1010A of itself. Both copies may be jumped to a protected, isolated location, to which isolated privileged import table 1060 may be provided. Once privileged resource request copy 260B and privileged import table 1060 are received by isolated privileged driver copy 1010A, copy 1010A may read an isolated privileged driver export table 1080 in response to instructions contained in privileged resource request copy 260B and privileged import table 1060. Isolated privileged driver export table 1080 may in turn comprise isolated privileged export table instructions 1090A-1090D, e.g., create, delete, push, pop, and the like. Such a destination would be particularly appropriate for a critical function.

The isolated privileged driver 1010 may create another privileged resource request copy 260C to jump along with isolated privileged import table 1060 through new linkage 840 to shadow kernel 620. Once privileged resource request 260C and isolated privileged import table 1060 are received by shadow kernel 620, using shadow kernel rules, the shadow kernel 620 may read shadow kernel export table 850 in response to instructions contained in privileged resource request 260 and the import table 310 that helped generate it. Shadow kernel rules may be predetermined by a user. Alternatively, or in addition, shadow kernel rules may be created "on the fly" during real-time operation of the invention.

The shadow kernel 620 may direct the privileged resource request 260 and the shadow kernel export table 850 to jump to the PVM 230. Once the privileged resource request 260 and the shadow kernel export table 850 are received by the PVM 230, the PVM 230 may read a PVM export table 810 in response to instructions contained in privileged resource request 260 and shadow kernel export table 850. The PVM export table 810 may comprise PVM export table instructions 815A-815D, e.g., open file, close file, delete file, rename file, and the like. Import table instructions 315A-315D, export table instructions 325A-325D, shadow kernel export table instructions 855A-855D, and PVM export table instructions 815A-815D may all be different from each other.

Using PVM export table 810, PVM 230 modifies privileged resource request 260 to create a modified resource request 710. PVM 230 may virtualize privileged resource request 260 by altering privileged resource request 260 to an alternate namespace, or otherwise modifying it based on a table of rules, thereby creating modified resource request 710.

PVM 230 may pass modified resource request 710 and PVM export table 810 to operating system kernel 160. Once OS kernel 160 has received modified resource request 710 and PVM export table 810, using OS rules, OS kernel 160 may generate export table 320 in response to instructions contained in modified resource request 710 and the PVM export table 810. OS rules may be predetermined by a user. Alternatively, or in addition, OS rules may be created "on the fly" during real-time operation of the invention.

As previously described, the kernel 160 may fulfill the modified resource request 710, deny it, or take any number of other actions.

Embodiments of the invention thus permit the loading of multiple copies of a given driver or code module in a given session. According to embodiments of the invention, a shadow kernel may accordingly be loaded in conjunction with a set of virtualized drivers. According to embodiments of the invention, multiple sessions of the virtual environment may accordingly be simultaneously loaded, each with its own shadow kernel and its own isolated set of drivers. The result is a robust, versatile, and efficient method for code isolation of privileged code in a virtual environment.

Implementation

By using the shadow kernel approach described above, trampoline code may be constructed. In the preferred embodiment, a shadow kernel is used as a template for creating the jump table required to redirect certain kernel functions to the PVM, while other non-critical functions may be redirected to the original kernel. In the preferred embodiment, this template based trampoline may be constructed using the following exemplary method:
1. Load a shadow kernel, using the approach described above.
2. Let E be the set of exported symbols from the shadow table (E will also match the set of exported symbols from the OS kernel, based on the technique used to load the shadow kernel).
3. Let P be the set of exported virtualizing functions in PVM.
4. For each exported symbol S in E:
   a. Resolve S relative to the shadow kernel's base address, yielding address A.
   b. Does S have a corresponding match in P? The determination as to whether or not S has a corresponding match in P may be done statically, or dynamically via a lookup table. The preferred embodiment uses a dynamic lookup table.
      i. If yes, write a "Jump P::S" to address A.
      ii. If no, write a "Jump OSKernel::S" to address A.

During subsequent driver load, a set of embodiments of the invention uses the shadow kernel's export table instead of the OS kernel's export table. Since the shadow kernel is a template, it exhibits exactly the same memory layout as the OS kernel. Therefore, the resolution of its import table is performed in a very straightforward way, as illustrated in the following steps:
1. Let I be the set of imported symbols required by the driver.
2. For each symbol S in I:
   a. Does I refer to "OSKernel"?
      i. If yes, alter "OSKernel" to "ShadowKernel."
      ii. If no, leave S as is.
   b. Resolve I.

Importing From Additional Loaded Isolated Drivers

There is an additional resolution step performed when a driver has other dependencies (e.g., other symbols in its import table besides those originating in the OSKernel). In the preferred embodiment, drivers that are loaded may participate in the symbol resolution sequence shown in the following steps:
1. Let I be the set of imported symbols required by the driver.
2. For each symbol S in I:
   a. Does I refer to "OSKernel"?
      i. If yes, alter "OSKernel" to "ShadowKernel."
      ii. If no,
         1. Does I refer to a symbol exported by a driver D loaded previously by this technique?
            a. If yes, alter "D" to "ShadowD."
   b. Resolve I.
3. Add this new driver to the list of known drivers (for subsequent use in step 2.a.ii.1 above as "ShadowX", where "X" is the name of the driver being loaded).

Shutdown

As with a real computer, it is typically advisable to shut down and clean up a virtual session to avoid accumulating unwanted code and to avoid potential conflicts that could occur in the future. Shutdown of a virtual machine using code isolation according to embodiments of the invention presents certain challenges. When a real kernel and a shadow kernel are present, there may be code that must be obtained from the real kernel rather than its shadow copy. The real kernel will be responsible for shutdown of sessions. Shutdown requires inducing drivers that depend on the real kernel to clean up and shut down.

In some cases, resources may have already been already allocated that may be blocking a certain desired shutdown event from happening. It would be useful to terminate such blocking calls to facilitate a fuller shutdown. To prevent a permanent block, a trampoline may be added to any blocking calls and another resource may be added to the blocking call that will interrupt it for various specified reasons, one being shutdown.

Typically, for example, an OS such as Windows will not unload a module if a module has code executing into it. Once a thread of execution starts that is awaiting a certain event, it cannot be interrupted unless the awaited event happens. For example, a thread of execution may be waiting until the system time reaches 10:00 P.M. In such situations, embodiments of the invention intercept the request to wait on that event and substitute a two-prong request, to wait on the original event and a shutdown event, whichever occurs first. This allows the release of all the threads that are waiting. In turn, unloading of the module in question is then possible.

To accomplish this shutdown process, embodiments of the invention identify threads that were created by drivers that were loaded in the virtual environment so that they may be woken up and purged using the trampoline process. If a driver cannot be shut down or unloaded, it is "hidden under the rug," that is, it is cooled to remove any links with the rest of the system, and any of its registrations are cancelled so it will not be called again.

External to the entire environment, according to embodiments of the invention, an orchestrator program simulates the order in which the operating system shuts down components, calling all drivers that have registered for such a notification according to the shutdown sequence. This enables the notification, according to embodiments of the invention, of loaded drivers immediately before the system is going to shut down, enabling them to flush their buffers or perform other needed pre-shutdown functions.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. A method comprising:
   instantiating a first kernel in a host environment of a computer, wherein the host environment comprises a second kernel with an export table generated according to operating system rules of the computer, and wherein the host environment comprises a process virtual machine (PVM);
   configuring the first kernel to transmit one or more privileged resource requests received by the first kernel to the PVM; and
   configuring the first kernel to transmit one or more non-privileged resource requests received by the first kernel to the second kernel.

2. The method of claim 1, wherein the second kernel is an operating system (OS) kernel and the first kernel is a copy of the OS kernel.

3. The method of claim 1, wherein the one or more privileged resource requests comprise a request associated with a privileged space of the host environment that is isolated from non-privileged space of the host environment.

4. The method of claim 3, wherein the PVM is located in the privileged space of the host environment.

5. The method of claim 1, further comprising:
   configuring the PVM to modify the one or more privileged resource requests and transmit the one or more privileged resource requests to the second kernel.

6. The method of claim 1, further comprising:
   configuring the PVM to create an export table based on a table of rules specified in the second kernel and instructions comprised in the one or more privileged resource requests.

7. The method of claim 1, wherein the one or more privileged resource requests comprise a request to an isolated application programming interface (API) associated with a privileged driver.

8. The method of claim 1, wherein the one or more privileged resource requests comprise a blocking call to a resource.

9. The method of claim 1, wherein the one or more privileged resource requests comprise a non-blocking call to a resource.

10. A computer comprising:
    at least one processor; and
    memory storing executable instructions configured to, when executed by the at least one processor, cause the computer to:
      instantiate a first kernel in a host environment of a computer, wherein the host environment comprises a second kernel with an export table generated according to operating system rules of the computer, and wherein the host environment comprises a process virtual machine (PVM);
      configure the first kernel to transmit one or more privileged resource requests received by the first kernel to the PVM; and
      configure the first kernel to transmit one or more non-privileged resource requests received by the first kernel to the second kernel.

11. The computer of claim 10, wherein the second kernel is an operating system (OS) kernel and the first kernel is a copy of the OS kernel.

12. The computer of claim 10, wherein the one or more privileged resource requests comprise a request associated with a privileged space of the host environment that is isolated from non-privileged space of the host environment.

13. The computer of claim 12, wherein the PVM is located in the privileged space of the host environment.

14. The computer of claim 10, wherein the memory further stores executable instructions configured to, when executed by the at least one processor, cause the computer to:
    configure the PVM to modify the one or more privileged resource requests and transmit the one or more privileged resource requests to the second kernel.

15. The computer of claim 10, wherein the memory further stores executable instructions configured to, when executed by the at least one processor, cause the computer to:
    configure the PVM to create an export table based on a table of rules specified in the second kernel and instructions comprised in the one or more privileged resource requests.

16. The computer of claim 10, wherein the one or more privileged resource requests comprise a request to an isolated application programming interface (API) associated with a privileged driver.

17. The computer of claim 10, wherein the one or more privileged resource request comprise a blocking call to a resource or a non-blocking call to a resource.

18. A method comprising:
    instantiating a first kernel in a host environment of a computer, wherein the host environment comprises a second kernel with an export table generated according to operating system rules of the computer, and wherein the host environment comprises a process virtual machine (PVM);
    configuring the first kernel to transmit one or more non-privileged resource requests received by the first kernel to the PVM; and
    configuring the first kernel to transmit one or more privileged resource requests received by the first kernel to the second kernel.

19. The method of claim 18, wherein the PVM is located in a privileged space of the host environment.

20. The method of claim 18 further comprising:
    configuring the PVM to modify the one or more non-privileged resource requests and transmit the one or more non-privileged resource requests to the second kernel.

* * * * *